UNITED STATES PATENT OFFICE.

HELON B. MACFARLAND, OF CHICAGO, ILLINOIS, AND ROBERT JAY SHOEMAKER, OF TOPEKA, KANSAS, ASSIGNORS, BY DIRECT AND MESNE ASSIGNMENTS, OF ONE-HALF TO SAID MACFARLAND AND ONE-HALF TO EGBERT H. GOLD, OF CHICAGO, ILLINOIS.

MATERIAL FOR INSULATING AND LIKE PURPOSES AND METHOD OF MANUFACTURING SAME.

1,252,468. Specification of Letters Patent. Patented Jan. 8, 1918.

No Drawing. Application filed April 11, 1917. Serial No. 161,137.

*To all whom it may concern:*

Be it known that we, HELON B. MACFARLAND and ROBERT J. SHOEMAKER, citizens of the United States, residing at Chicago, in the county of Cook and State of Illinois, and Topeka, in the county of Shawnee and State of Kansas, respectively, have invented certain new and useful Improvements in Materials for Insulating and like Purposes and Methods of Manufacturing Same, of which the following is a specification.

Our invention relates to the production of a material of a somewhat feltlike character suitable for use, for example, in railway cars, buildings or other structures for the purpose of heat insulation, the deadening of sound, or for other like purposes.

The object of the invention is to provide a material of this type which will be homogeneous in its character, relatively tough but flexible, and capable of being produced at a low cost.

The material consists of fibers of one sort or another, vegetable or animal, or mineral substances of a general fibrous character such as asbestos and mineral wool, mixed with a filler and binder consisting of a cellulose pulp. The pulp is preferably derived from the marine plant known as eel grass, this plant being obtainable in large quantities at very slight cost. We may also use the same plant to give the fibrous constituent of the product, and a material very satisfactory in some respects and for some purposes is obtainable in this way; but where certain qualities are required we may use, in place of the raw eel grass fibers, or in combination with them, animal hair, asbestos, or other fibrous material, vegetable, animal, or mineral.

The manufacture of the product, according to our preferred method, is as follows: The eel grass is cooked with an alkali, preferably with a dilute solution of caustic soda, either under steam pressure or in an open vessel. The length of time that the material is cooked and the amount of alkali used depends upon the condition of the raw material, the grass when dry requiring more treatment than the freshly cut material. The cooking with the alkali is carried on until the woody portion of the eel grass is softened and the pectic, resinous and nitrogeneous constituents of the plant loosened from the fibers.

The material thus treated is then washed and the fibrous constituent is beaten to a pulp in any suitable beating or pulping machine. The pulp so formed is then mixed with fibrous material of any desired kind. For example, a material having useful properties may be made by mixing together fifty per cent., by weight, of raw eel grass with fifty per cent. of pulp made in the manner above described. The physical qualities of the material may be varied by varying these proportions. For example, if a more rigid and dense material is desired the proportion of the pulp will be increased. Thus it is possible to make a material containing approximately eighty per cent. of the pulp and twenty per cent. of the raw grass.

The mixing is preferably accomplished by introducing the fibrous matter into the beater in which the alkali treated material has been pulped. After the fibrous material and the pulp have been thoroughly mixed the material is drained to remove excess of water, pressed or rolled into boards or sheets of any desired shape and size, and subsequently dried.

Instead of using eel grass for the fibrous constituent of the product we may employ animal hair which, when mixed with the pulp and manufactured into sheets or boards, gives a product which has great pliability. In order to make the product more capable of resisting fire it is possible to use mineral wool or asbestos as the fibrous constituent or as a part thereof.

We claim:

1. A product for insulation or like purposes, in the form of a flexible board composed of material of a fibrous nature intimately mixed with a filler and a binder consisting of pulped cellulose.

2. A product for insulation or like purposes, in the form of a flexible board composed of material of a fibrous nature intimately mixed with a filler, and a binder consisting of pulped eel grass fibers.

3. A product for insulation or like purposes, in the form of a flexible board composed of material of a fibrous nature intimately mixed with a filler, and a binder consisting of pulped eel grass from which the non-fibrous constituents of the plant have been removed.

4. A product for insulation or like purposes, in the form of a flexible board composed of material of a fibrous nature intimately mixed with a filler, and a binder consisting of eel grass cooked and beaten to a pulp.

5. A product for insulation or like purposes, in the form of a flexible board composed of eel grass fibers mixed with a filler and a binder consisting of pulped cellulose.

6. A product for insulation or like purposes, in the form of a flexible board composed of eel grass fibers mixed with a filler and a binder consisting of pulped eel grass fibers.

7. A product for insulation, or like purposes, in the form of a flexible board comprising animal hair intimately mixed with a filler and a binder consisting of pulped cellulose.

8. A product for insulation, or like purposes, in the form of a flexible board comprising animal hair intimately mixed with a filler, and a binder consisting of pulped eel grass fibers.

9. A product for insulation, or like purposes, in the form of a flexible board comprising material of a fibrous character mixed with pulped eel grass fibers.

10. A product for insulation, or like purposes, comprising eel grass fibers mixed with the pulped fibers of the same plant.

11. The method of manufacturing a product of the character described which consists in forming a pulp of eel grass fibers, and intimately mixing therewith raw eel grass.

12. The method of manufacturing a product of the character described which consists in cooking eel grass fibers with an alkali, pulping the fibers by beating, and mixing raw eel grass with the pulp thus formed.

HELON B. MacFARLAND.
ROBERT JAY SHOEMAKER.